United States Patent [19]

Bell et al.

[11] 4,428,596
[45] Jan. 31, 1984

[54] TRAILER SAFETY HITCH

[76] Inventors: Tommy G. Bell, 2715 N. Emerson; Lloyd Bell, P.O. Box 552, Suburban Trailer Park, both of Enid, Okla. 73701

[21] Appl. No.: 357,427

[22] Filed: Mar. 12, 1982

[51] Int. Cl.³ .............................................. B60D 1/12
[52] U.S. Cl. .................................. 280/507; 248/222.1; 280/457; 280/511; 403/353
[58] Field of Search .................... 280/504, 507–515, 280/414 R, 432, 446, 457; 248/224, 222.1; 403/353, 406

[56] References Cited

U.S. PATENT DOCUMENTS

| | | | |
|---|---|---|---|
| 2,088,991 | 8/1937 | Berchtold | 280/33.15 |
| 2,614,861 | 10/1952 | Van Horn | 280/33.15 |
| 2,650,101 | 8/1953 | Frankfother | 280/33.9 |
| 2,788,990 | 4/1957 | Barcafer | 280/457 |
| 2,815,225 | 12/1957 | Barcafer | 280/457 |
| 2,998,982 | 9/1961 | Brazil | 280/457 |
| 3,123,383 | 3/1964 | Humpal | 280/457 |
| 3,125,355 | 3/1964 | Snuggins | 280/457 |
| 3,265,407 | 8/1966 | Paddock | 280/457 |
| 3,341,226 | 9/1967 | Broun | 280/457 |
| 3,400,948 | 9/1968 | Matson | 280/406 |
| 3,471,170 | 10/1969 | Rendessy | 280/446 |
| 3,549,173 | 12/1970 | Stanfield | 280/457 |
| 3,770,298 | 11/1973 | Phillips | 280/457 |
| 3,827,722 | 8/1974 | Miller et al. | 280/432 |
| 3,900,214 | 8/1975 | Brockelsby | 280/511 X |

Primary Examiner—Joseph F. Peters, Jr.
Assistant Examiner—Mitchell J. Hill
Attorney, Agent, or Firm—Dunlap & Codding

[57] ABSTRACT

A safety hitch for connecting a trailer to a towing vehicle, the safety hitch including a plate, that is connected between the trailer tongue and a hitch member mounted on the vehicle, to coact with the ball and socket connection between the trailer tongue and hitch member to prevent dislodgment of the ball of the hitch member from the socket in the trailer tongue. The plate has a keyhole slot formed therethrough such that the plate can be placed on the hitch member and moved to a position to engage small portions of the slot with portions of the hitch member underlying the ball for securing the plate to the hitch member in such position. Upwardly extending, apertured lugs mounted on the base plate engage the sides of the trailer tongue and are pinned thereto via a pin that passes through a hole through the trailer tongue, such hole being positioned to align the socket in the trailer tongue with small portions of the slot. An upwardly extending heel portion of the plate engages the underside of the tongue to prevent the tongue from pivoting off the ball and the engagement of the ball and socket prevents movement of the base plate which would permit the large portion of the slot from becoming aligned with the ball for dislodgment of the base plate from the hitch member.

7 Claims, 3 Drawing Figures

TRAILER SAFETY HITCH

BACKGROUND OF THE INVENTION

1. Field of the Invention

The present invention relates generally to improvements in trailer hitches and more particularly, but not by way of limitation, to safety equipment usable with trailer hitches of the ball and socket type.

2. Brief Description of the Prior Art

A conventional type of trailer hitch that is in widespread use includes a hitch member which is mounted on a vehicle which is to tow a trailer and has a ball portion at its upper end. A socket formed in the tongue of the trailer to be towed receives the ball and a locking mechanism is provided in the trailer tongue to hold the ball in the socket once the socket has been placed over the ball. An important feature of this type of trailer hitch, from the viewpoint of the user, is the ease with which it can be used. A trailer can be connected to a towing vehicle by merely placing the socket in the trailer tongue over the ball of the hitch member, which can be permanently mounted on the towing vehicle, followed by engaging the locking mechanism in the trailer tongue.

While the ball and socket type of trailer hitching system is thus very convenient to the user, problems have arisen with the use of this type of system. A well known danger that exists with regard to these systems is that the locking mechanism in the trailer tongue can work loose while the trailer is being towed. If this occurs, the trailer can separate from the towing vehicle to become a danger to persons using the public thoroughfare along which the trailer and towing vehicle are moving. Because of this danger, a number of states require that the ball and socket hitch be supplemented by chains that connect the trailer to the vehicle so that, should the ball become dislodged from the socket, the trailer and towing vehicle will remain connected. Thus, the driver of the towing vehicle will retain at least some control over the movement of the trailer and, it is hoped, be able to bring the trailer and towing vehicle safely to a halt. Unfortunately, these hopes are often not realized in practice. Because of the flexibility of the chains, the driver's control over the movements of the towing vehicle and trailer may be very limited. For example, the chains may have been connected in such a way that the front end of the trailer can undergo rapid side-to-side movements that make it very difficult for the driver of the towing vehicle to maintain control of the trailer and towing vehicle system as he brings them to a halt. Thus, while the chains may prevent the trailer from breaking loose from the towing vehicle, they may do so at the expense of causing the combined vehicle and trailer system to become a danger which is often equal or greater than the danger that would be presented by a freely moving trailer.

A second problem, often not recognized by the user of a trailer, stems from an inherent characteristic of the ball and socket connection. In order to meet various road conditions, this connection must have some freedom of movement and such freedom of movement is built into the ball and socket connection via the shaping of the ball. That is, the trailer tongue can pivot on the ball about substantially any diametric axis through the ball. Moreover, the pivotation along an axis extending longitudinally of the trailer tongue can generally be fairly large. This freedom of movement of the trailer tongue about its longitudinal axis permits the trailer to sway from side-to-side and, if the trailer has been improperly loaded so that it is top heavy, the swaying of the trailer can build up to an extent that the trailer begins to topple. Because of the large angle of pivotation that the ball and socket connection permits the trailer tongue to undergo about its longitudinal axis before encountering any resistance, the connection between the trailer and the towing vehicle may not be able to prevent such toppling from occurring. Either the trailer will be broken loose from the vehicle or, in some cases, the toppling of the trailer can cause the towing vehicle to be overturned.

While these problems can be overcome, practical considerations have, in the past, militated against their solution. As has been previously noted, a major advantage of the ball and socket trailer hitch is the ease with which such trailer hitch can be used; that is, the advantage is one of convenience. The user of a trailer expects this convenience and is generally unwilling to accept a hitching system which, though perhaps safer than the ball and socket hitching system, would be very difficult to use. In addition, the expense of a hitching system can very well deter the user from employing it to supplement the conventional ball and socket system. Moreover, another consideration that can deter a trailer user from employing a particular type of hitching system, even though it has a safety advantage over the ball and socket system, stems from the fact that the towing vehicle is often a family automobile. The ball hitch is an unobtrusive addition to the automobile so that it can be permanently mounted on the automobile without interfering with other uses; for example, transportation to social affairs, to which the automobile might be put. Thus, while solutions to the problems discussed above can be found, such solutions have generally not been employed prior to the present invention. Instead, users have generally relied on the ball and socket trailer hitch with the use of chains to supplement the connection between the vehicle and trailer that is provided by the ball and socket system.

SUMMARY OF THE INVENTION

The present invention solves the problems described above in a manner that avoids the drawbacks that have, in the past, often resulted in reliable safety measures not being taken. Initially, it should be noted that little problem is encountered with the ball hitch member coming loose from the towing vehicle; it can be securely attached thereto and is generally strong enough that breakage of the hitch member itself is not likely to occur. Thus, if the socket in the trailer tongue can be prevented from disengaging the ball of the hitch member, separation of the trailer from the towing vehicle will not occur. In addition, the ball hitch member and its connection to the towing vehicle are capable of supporting torques that might arise from swaying of the trailer for relatively small angles of tilt of the trailer. That is, if the trailer tongue is connected to the ball in such a way that it will provide early resistance and damping to swaying of the trailer, without eliminating the flexibility between the trailer and towing vehicle necessary for, for example, maneuvering the trailer-towing vehicle system, the ball hitch member will suffice as the only mechanism that need be permanently mounted on the vehicle.

The present invention provides a safety connector that can be readily connected between the ball hitch member on the vehicle and the trailer tongue to solve the above problems such that the only permanent addition to the vehicle is the ball hitch member. Moreover, the safety connector is both inexpensive of manufacture and very easily employed. Indeed, the mounting of the safety connector is, if anything, more easily accomplished than is the connection of chains between the trailer and the towing vehicle.

To these ends, the hitch member used with the safety connector is provided with a circumferential groove below the ball to receive a base plate forming a part of the safety connector. The base plate has an elongated slot formed therethrough, the slot having relatively large dimensions at one end and smaller dimensions at the other end. Thus, the base plate can be readily mounted on the hitch member, to engage the groove, by placing one end of the slot over the ball and then moving the base plate to a position such that portions of the base plate near the other end of the slot are disposed within the circumferential groove in the ball hitch member. In addition, the safety connector of the present invention is provided with a means for pinning the connector to the trailer tongue while the safety connector is so positioned on the hitch member so that the connector and trailer tongue are readily interconnected once the connector has been mounted on the hitch member. This pin connection is accomplished via lugs that extend upwardly from the base plate to engage the sides of the trailer tongue so that a pin can be inserted through apertures in the lugs and a hole through the trailer tongue with the result that the trailer tongue is pivotally connected to the base plate for pivotation toward and away from the base plate. The apertures and hole are placed so that the socket will overlay the small end portion of the slot when the trailer tongue is pinned to the base plate with result that, while the ball is in the socket, the base plate cannot become disengaged from the trailer hitch member. The ball is then caused to be retained in the socket by a portion of the connector that engages the underside of the trailer tongue to limit the pivotation of portions of the trailer tongue wherein the socket is formed away from the base plate. Thus, once the trailer tongue has been pinned to the base plate, the connector positions the trailer tongue relative to the hitch member so that disengagement of the ball and socket cannot occur and engagement of the ball and socket positions the connector on the hitch member so that disengagement between the connector and the hitch member similarly cannot occur.

In addition, the engagement of the base plate with portions of the hitch member defining the circumferential groove in conjunction with the laminar character of the base plate provides the trailer-towing vehicle system with a capability for damping swaying of the trailer that might result in toppling of the trailer if the trailer has been improperly loaded so that it is top heavy. In particular, the disposition of portions of the base plate in the groove coupled with the connection between the base plate and the trailer tongue via the lugs results in the connector providing a resistance to swaying of the trailer that comes into play for relatively small angles of tilt of the trailer. Moreover, such resistance is of a resilient character that tends to damp swaying of the trailer because of the plate-like character of the base plate.

An object of the present invention is to eliminate dangers that have existed in the towing of trailers via ball and socket hitches.

Another object of the invention is to provide a trailer safety hitch which combines retention of the connection between a trailer and a towing vehicle with a capability for damping swaying movements of the trailer.

Still another object of the present invention is to provide an effective trailer safety hitch that is convenient to use.

A further object of the present invention is to provide an effective trailer safety hitch that requires no permanent connection to a towing vehicle other than a ball hitch mounted thereon.

Yet another object of the invention is to achieve these and other objects in a trailer safety hitch that is inexpensive to manufacture.

Other objects, advantages and features of the present invention will become clear from the following detailed description of the preferred embodiment of the invention when read in conjunction with the drawings and appended claims.

DESCRIPTION OF THE PREFERRED EMBODIMENT

Figure 1:
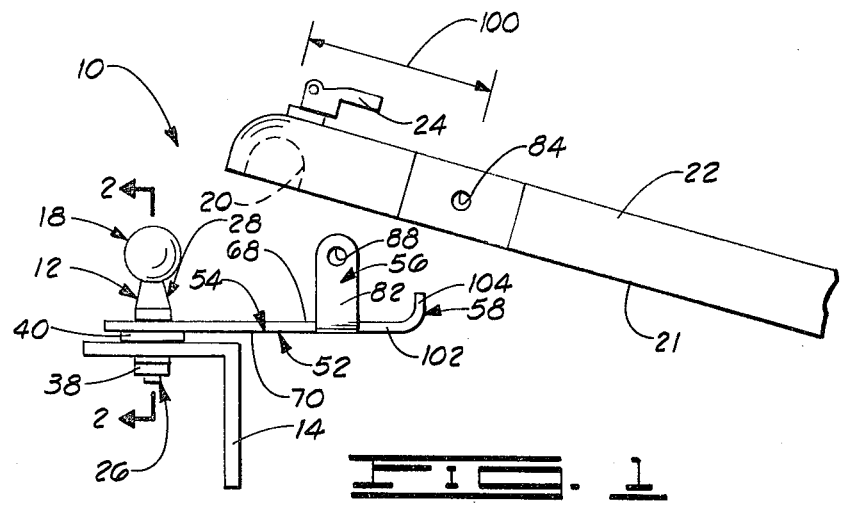
FIG. 1 is a side elevational view of the trailer safety hitch of the present invention.

Referring now to the drawings and to FIG. 1 in particular, shown therein, and designated by the general reference numeral 10, is a trailer safety hitch constructed in accordance with the present invention. The safety hitch 10 comprises a circular hitch member 12 which can be mounted on a towing vehicle which has been schematically represented by the angle member 14 in FIG. 1. Such angle member 14 can be part of a drawbar on the vehicle, a bumper or other suitable portion of the vehicle through which an aperture 16 (FIG. 2) can be formed for mounting the hitch member on the vehicle as will be discussed below.

The hitch member 12 includes a ball member 18 which is received in the socket 20 of a conventional trailer hitch. The socket 20 is formed in the underside 21 of a trailer tongue 22 which can be provided with a conventional locking mechanism (not shown) operable via an operating handle 24 mounted on the trailer tongue 22.

Figure 2:
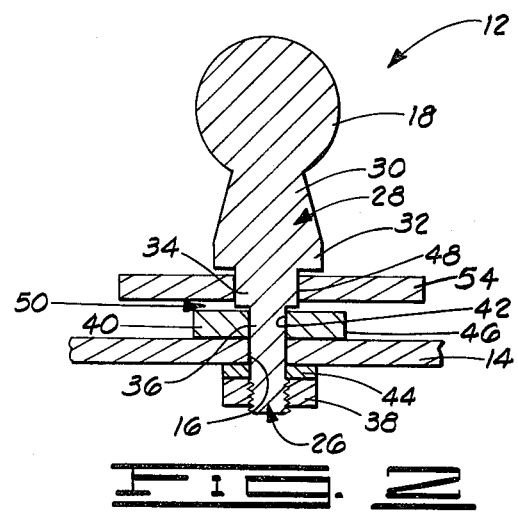
FIG. 2 is a cross-section in side elevation of the hitch member of the trailer safety hitch of FIG. 1 taken along line 2—2 of FIG. 1.

The structure of the hitch member 12 has been particularly shown in FIG. 2 as well as the preferred mounting of the hitch member 12 on the member 14. As shown in this Figure, the hitch member 12 comprises, in addition to the ball member 18, a shank member 26 which is surmounted by the ball member 18. In the preferred embodiment of the invention, the hitch member further comprises an intermediate member 28 which is disposed between the ball member 18 and the shank member 26 and these three components of the hitch member 12 can be formed unitarily as has been indicated in FIG. 2.

The ball member 18, intermediate member 28 and shank member 26 are formed with a general progression in their diameters; that is, the ball member 18 is generally larger than the intermediate member 28 and the intermediate member 28 is generally larger than the shank member 26. As shown in FIG. 2, the intermediate member 28 can have a frustoconical portion 30 which need not enter into this general diameter progression; rather, it will suffice for purposes of the present invention that the intermediate member 28 has a portion 32 adjacent to, and larger in diameter than, a portion of the shank member 26 and that the shank member 26 is smaller in diameter than the ball member 18.

In the preferred embodiment of the invention, the shank member 26 comprises a cylindrical connector engagement portion 34 adjacent the intermediate member 28 and depending coaxially therefrom. A stud portion 36 of the shank member 26 depends axially from the connector engagement portion 34 thereof and the distal end of the stud portion 36 is threaded to receive a nut 38 by means of which the hitch member 12 is mounted on a suitable portion of a towing vehicle as represented by the member 14 in FIGS. 1 and 2.

The hitch member 12 further comprises a ring 40 having a central aperture 42 formed on a diameter substantially equal to the diameter of the stud portion 36 of the shank member 26 so that the ring 40 can slide on the stud portion 36 to a position adjacent the connector engagement portion 34 of the shank member 26. The hitch member 12 is mounted on the member 14 by disposing the ring 40 on the stud portion 36 of the shank member 26, passing the stud portion 36 through the aperture 16 in the member 14, and screwing the bolt 38 onto the stud portion 36 with a lock washer 44 interposed between the member 14 and the nut 38 to secure the member 14 between the washer 44 and ring 40.

One aspect of the present invention resides in a coactive relation between the ring 40, the shank member 26; in particular, the connector engagement portion 34 thereof, and the intermediate member 28 resulting from the above described mounting of the hitch member 12 on the member 14. As shown in the drawings, the diameter of the outer peripheral surface 46 of the ring 40 is greater than the diameter of the axially extending peripheral surface 48 of the connector engagement portion 34 of the shank member 26 with the result that the ring 40 coacts with the shank member 26 and the intermediate member 28 to form a groove 50 that extends circumferentially about the hitch member 12 with axially extending portions of the surface of the groove 50 being defined by the outer peripheral surface 48 of the connector engagement portion 34 of the shank member 26. The purpose for forming the groove 50 about the hitch member 12 will be discussed below.

Figure 3:
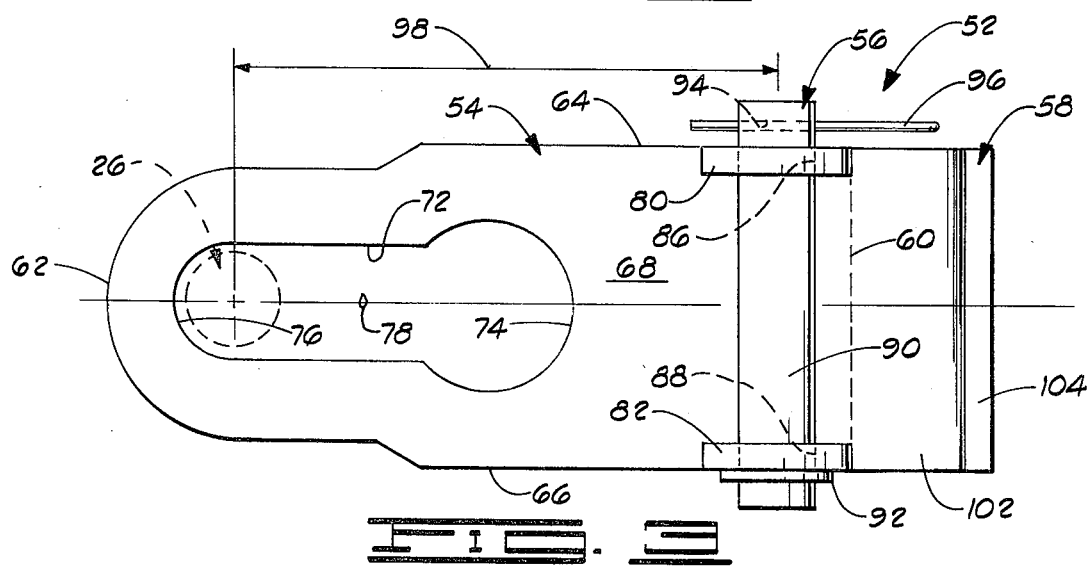
FIG. 3 is a plan view of the safety connector of the trailer safety hitch of FIG. 1.

Returning now to FIG. 1, the safety hitch 10 further comprises a safety connector 52 which is also shown in FIG. 3. The safety connector 52, in turn, generally comprises: (1) a base plate 54 which is mounted on the hitch member 12 at such times that a trailer is to be towed; (2) a pinning assembly 56 by means of which the trailer tongue 22 is pivotally connected to the base plate 54; and (3) a pivotation limiting assembly 58. As shown in the drawings, the pivotation limiting assembly 58 can be formed integrally with the base plate 54 such that the pivotation limiting assembly 58 is an extension of the base plate 54 from a rear end 60 of the base plate 54 indicated by a dashed line in FIG. 3.

The base plate 54 is formed of plate metal and has a forward end 62 opposite the rear end 60 thereof, opposed first and second sides 64 and 66 respectively, and upper and lower surfaces 68 and 70 (FIG. 1) respectively. Near the forward end 62 of the base plate 54, an elongated slot 72 is formed through the base plate 54 to intersect the upper and lower surfaces 68 and 70 thereof. The slot 72 has a first end 74, a second end 76 and is preferably disposed longitudinally along a front-to-rear axis 78 of the base plate 54. The slot 72 has the general form of a keyhole; portions of the slot adjacent the first end 74 thereof being larger than portions of the slot adjacent the second end 76 thereof. In particular, portions of the slot 72 adjacent the first end 74 are dimensioned such that these portions can be placed over the ball member 18 and intermediate member 28 of the hitch member 12 to align the base member 12 with the groove 50 formed circumferentially about the hitch member 12. Portions of the slot 72 adjacent the second end 76 thereof, on the othe hand, are dimensioned to pass the shank member 26 but not the ball member 18 nor the intermediate member 28. Thus, the base plate 54 can be mounted on the hitch member 12 by placing portions of the slot 72 adjacent the first end 74 thereof over the ball member 18 and then moving the base plate 54 rearwardly to dispose portions of the base plate 54 about the second end 76 of the slot 72 in the groove 50 formed circumferentially about the hitch member 12.

Preferably, and as shown in FIG. 3, the second end 76 of the slot 72; that is, the smaller end thereof, is positioned adjacent the forward end 62 of the base plate 54 and the first, or larger, end 74 of the slot 72 is positioned rearwardly of the second end 76 thereof. Such positioning of the slot 72 in the base plate 54, as well as the general disposition of the slot 72 along the front-to-rear axis 78, provides the safety connector 52 with a compact structure as will be clear from the discussion of the use of the safety connector 52 to follow.

The pinning assembly 56 comprises a pair of lugs 80 and 82 which are preferably welded to the base plate 54 at the sides 64 and 66 respectively thereof and adjacent the rear end 60 thereof. The lugs 80 and 82 extend upwardly from the upper surface 68 of the base plate 54 in substantially parallel relation and are spaced apart a distance sufficient that the trailer tongue 22 can be received between the lugs 80 and 82. A transverse hole 84 (FIG. 1) is formed through the trailer tongue 22 and aligned apertures 86 and 88 are formed through the lugs 80 and 82 respectively so that the base plate 54 can be pivotally connected to the trailer tongue 22 via the pinning assembly 56. For this purpose, the pinning assembly 56 further comprises a pin 90 that can be inserted through the apertures 86 and 88 and the hole 84 after the trailer tongue 22 is positioned between the lugs 80 and 82. In order to retain the pin 90 within the apertures 86 and 88 and the hole 84, a flange 92 can be formed on the pin 90 near one end thereof and a hole 94 can be formed through the pin 90, near the other end thereof, to receive a conventional wire retainer 96.

An important aspect of the invention lies in a relationship between the relative positions of the hole 84 and socket 20 in the trailer tongue, on the one hand, and the relative positions of the second end 76 of the slot 72 and the apertures 86 and 88 in the lugs 80 and 82, on the other hand. To illustrate this relationship, the position of the shank member 26 and the slot 72 during towing of a trailer has been indicated in dashed lines in FIG. 3. In the practice of the invention, the slot 72 is positioned with respect to the lugs 80 and 86 such that the distance 98 between the center of the shank member 26 and the center of the pin 90, when the shank member 26 is positioned adjacent the second end 76 of the slot 72, is substantially equal to the distance 100 (FIG. 1) between the center of the socket 20 and the hole 84 through the trailer tongue 22. That is, the connection of the trailer tongue 22 to the base plate 54 via the pinning assembly 56 concurrently positions the trailer tongue with respect to the base plate 54 such that the socket 20 is disposed above portions of the slot 72 near the second end 76 thereof. Thus, the mating of the ball member 18 with the socket 20 and the pinning of the lugs 80 and 82 to the trailer tongue 22 positions the shank portion 26 of the hitch member in small portions of the slot 72 so that the safety connector 52 cannot become dislodged from the hitch member 12 other than by pivotation of the trailer tongue 22, to lift the socket 20 off the ball member 18, so that the base plate 54 can be longitudinally shifted to bring portions of the slot 72 near the first end 74 thereof into register with the hitch member 12.

The pivotation limiting assembly 58 is provided to prevent pivotation of the trailer tongue 22 on the safety connector 52 sufficiently to permit the socket 22 to lift off the ball member 18 once the safety connector 52 has been mounted on the hitch member 12, with the shank member 26 disposed in the slot 72 near the small end 76 thereof, as shown in FIG. 3, and pinned to the trailer tongue 22. As shown in FIG. 1, the pivotation limiting assembly comprises a plate-like member 102 that extends rearwardly of the base plate 54 and has an upturned heel portion 104. Should the trailer tongue 22 pivot on the safety connector 52 in a direction that would tend to lift the socket 20 off the ball member 18, the underside 21 of the trailer tongue 22 will engage the upturned heel portion 104 to limit such pivotation to a relatively small angle for which the ball member 18 remains captive in the socket 20. Thus, once the safety connector 56 is connected between the hitch member 12 and the trailer tongue 22, the engagement between the ball member 18 and socket 20 prevents the safety connector 52 from becoming dislodged from the hitch member 12 and the construction of the safety connector 52 prevents the ball member 18 from becoming dislodged from the cavity 20. Accordingly, the trailer tongue 22 is securely fastened to the hitch member 12 with the ball member 18 held in the socket 20 to prevent separation of the trailer from the towing vehicle.

Operation of the Preferred Embodiment

At such times that a trailer is not to be towed, the safety connector 52 is conveniently stored with the trailer by pinning the safety connector 52 to the trailer tongue 22 with the trailer separate from the towing vehicle. Thus, the only part of the safety hitch 10 that remains with the vehicle is the hitch member 12 so that the safety hitch 10 presents no interference with any purpose to which the owner of the vehicle may wish to put it.

When it is desired to tow the trailer, the retainer 96 is removed from the pin 90 and the pin 90 is removed from the lugs 80 and 82 so that the safety connector 52 can be dropped away from the trailer tongue 22. The safety connector 52 is then mounted on the hitch member 12 by passing portions of the slot 72 near the first end thereof over the ball member 18 and subsequently moving the base plate 54 rearwardly to position portions of the base plate 72 adjacent the second end 76 of the slot 72 about the shank member 26. With the safety connector 52 so disposed on the hitch member 12, the trailer tongue 22 is moved to a position over the hitch member 12 that will permit the socket 20 to be engaged with the ball member 18 and the locking mechanism in the trailer to be operated, after such engagement, to secure the ball member 18 in the socket 20. Thereafter, the safety connector 52 is rotated about the shank member 26 to a position in which the trailer tongue 22 overlays the base plate 54 and rear portions of the base plate 54 are lifted to align the apertures 86 and 88 in the lugs 80 and 82 with the hole 84 through the trailer tongue 22. The pin 90 is then inserted through the apertures 86 and 88 and the hole 84 and secured with the retainer 96. The towing vehicle and trailer will then be in a condition for the vehicle to tow the trailer.

Should the conventional locking mechanism in the trailer tongue 22 work loose during the towing of the trailer, the safety connector retains the ball member 18 in the socket 20 and is itself retained on the hitch member 12 via the engagement of the ball member 18 and socket 20 so that the towing proceeds in a normal manner without mishap arising from the looseness of the locking mechanism. Since the shank member 26 has a circular cross-section, the connection provided by the safety connector 52 will in no way interfere with the maneuvering of the towing vehicle-trailer combination and, as has been shown in FIG. 2, the groove 50 in the hitch member 12 can be made wider than the thickness of the base plate 54 so that the safety connector 52 will not interfere with normal flexing of the connection between the trailer tongue 22 and the hitch member 12 that occurs during normal towing operations.

However, should the trailer sway to the side in a vertical plane such that a danger of toppling of the trailer might occur, the positioning of the base plate 54 in the groove 50 will cause the base plate 54 to torsionally engage the hitch member 12 after only a small angle of tilt of the trailer has occurred. As a result, the base plate 54 will twist slightly to exert a torque on the trailer that tends to right the trailer before the tilt can be sufficient, even with improper loading of the trailer such that the trailer is top heavy, to prevent a serious hazard that the trailer might topple onto its side.

It is clear that the present invention is well adapted to carry out the objects and attain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the appended claims.

What is claimed is:

1. A safety hitch for securing a trailer tongue, having a ball receiving socket formed in the under side thereof, to a towing vehicle, comprising:
   a circular hitch member having a relatively small diameter shank member surmounted by a larger diameter ball member, the shank member adapted for mounting on the towing vehicle; and
   a safety connector, comprising:
       a base plate having an elongated slot formed therethrough, portions of the slot near a first end thereof dimensioned to pass the ball member therethrough and portions of the slot near an opposed second end thereof dimensioned to pass the shank member therethrough but of insufficient dimensions to pass the ball member therethrough;
       means for pinning the trailer tongue to the base plate in an overlaying relation to the base plate for pivotation of portions of the trailer tongue wherein the socket is moved toward and away from the base plate and for concurrently positioning the socket above portions of the slot near the second thereof; and means, adapted to engage the trailer tongue at such times that the trailer tongue is pinned to the base plate, for limiting pivotation of portions of the trailer tongue, wherein the socket is formed, away from the base plate.

2. The safety hitch of claim 1 wherein the hitch member further comprises:

an intermediate member disposed between the ball member and the shank member, portions of the intermediate member adjacent the shank member being formed on a diameter to pass through portions of the slot of said base plate near the first end thereof but too large to pass through portions of the slot near the second end thereof; and groove-forming means, coacting with the shank member and the intermediate member of said hitch member for providing the hitch member with a groove in the circular periphery thereof, said groove extending circumferentially about the hitch member and being defined in part by portions of the periphery of the shank member that are disposed adjacent the intermediate member.

3. The safety hitch of claim 2 wherein the shank member comprises:

a connector engagement portion adjacent the intermediate member of the hitch member; and a reduced diameter stud portion depending axially from the connector engagement portion, the distal end of the stud portion being threaded for receiving a nut to bolt the hitch member to the towing vehicle; and wherein the groove-forming means is characterized as being a ring having a central aperture of a diameter substantially equal to the diameter of the stud portion and an outer diameter larger than the diameter of the connector engagement portion of the shank member of said hitch member, whereby the hitch member can be bolted to a portion of the towing vehicle with such portion of the vehicle disposed between the nut and the ring such that the ring, the intermediate member, and the connector engagement portion of the shank member of said hitch member define said groove.

4. A safety connector for securing a trailer tongue, having a ball receiving socket located in the under side thereof, to a hitch member, having a relatively small diameter shank member surmounted by a larger diameter ball member, adapted for mounting on a towing vehicle, comprising:

a base plate having an elongated slot formed therethrough, portions of the slot near a first end thereof dimensioned to pass the ball member therethrough and portions of the slot near an opposed second end dimensioned to pass the shank member therethrough but of insufficient dimensions to pass the ball member therethrough;

means for pinning the trailer tongue to the base plate in an overlaying relation to the base plate for pivotation of portions of the trailer tongue wherein the socket is located toward and away from the base plate and for concurrently positioning the socket above portions of the slot near the second end thereof; and means, adapted to engage the trailer tongue at such times that the trailer tongue is pinned to the base plate, for limiting pivotation of portions of the trailer tongue wherein the socket is formed away from the base plate.

5. The safety connector of claim 4 wherein the base plate is characterized as having a forward end and a rear end; wherein the slot is located in portions of the base plate near the forward end thereof; and wherein the means for limiting pivotation of the trailer tongue on the base plate is characterized as being a plate-like member extending rearwardly of the base plate and having an upturned heel portion to engage the underside of the trailer tongue.

6. The safety connector of claim 5 wherein the slot extends longitudinally along a front-to-rear axis of the base plate, the second end of the slot being disposed adjacent the forward end of the base plate and the first end of the slot being disposed rearwardly of the second end of the slot.

7. The safety connector of claim 4, 5 or 6 wherein the trailer tongue is characterized as having a transverse hole formed therethrough rearwardly of said socket and wherein the means for pinning the trailer tongue to the base plate comprises:

a pair of lugs attached to the base plate and extending upwardly therefrom in a spaced apart, substantially parallel relation to engage opposite sides of the trailer tongue, each lug having an aperture formed therethrough to register with the hole formed through the trailer tongue at such times that the trailer tongue is disposed between the lugs and the socket formed in the under side of the trailer tongue overlays portions of the slot adjacent the second end thereof; and a pin insertable through the apertures in the lugs and the hole formed through the trailer tongue.

* * * * *